(12) United States Patent
O'Connor et al.

(10) Patent No.: US 8,559,100 B2
(45) Date of Patent: Oct. 15, 2013

(54) COATED ARTICLE WITH LOW-E COATING HAVING ABSORBING LAYER OVER FUNCTIONAL LAYER DESIGNED TO INCREASE OUTSIDE REFLECTANCE

(75) Inventors: Kevin O'Connor, LaSalle (CA); Jingyu Lao, Saline, MI (US); John Wolff, Fresno, CA (US)

(73) Assignee: Guardian Industries Corp., Auburn Hills, MI (US)

( * ) Notice: Subject to any disclaimer, the term of this patent is extended or adjusted under 35 U.S.C. 154(b) by 188 days.

(21) Appl. No.: 13/317,176

(22) Filed: Oct. 12, 2011

(65) Prior Publication Data
US 2013/0094076 A1   Apr. 18, 2013

(51) Int. Cl.
*F21V 9/02* (2006.01)
*G02B 5/22* (2006.01)
*G02B 5/28* (2006.01)

(52) U.S. Cl.
CPC ..................... *G02B 5/282* (2013.01)
USPC ......................................... 359/360

(58) Field of Classification Search
None
See application file for complete search history.

(56) References Cited

U.S. PATENT DOCUMENTS

| | | |
|---|---|---|
| 6,132,881 A | 10/2000 | Hartig et al. |
| 6,576,349 B2 | 6/2003 | Lingle et al. |
| 7,025,859 B2 | 4/2006 | Stachowiak |
| 7,147,924 B2 | 12/2006 | Stachowiak |
| 7,189,458 B2 | 3/2007 | Ferreira et al. |
| 7,198,851 B2 | 4/2007 | Lemmer et al. |
| 7,217,461 B2 | 5/2007 | Ferreira et al. |
| 7,344,782 B2 | 3/2008 | Lingle et al. |
| 7,419,725 B2 | 9/2008 | Neuman et al. |
| 7,648,769 B2 | 1/2010 | Blacker et al. |
| 7,858,191 B2 | 12/2010 | Lemmer et al. |
| 7,879,448 B2 | 2/2011 | Dietrich et al. |
| 8,017,243 B2 | 9/2011 | Blacker et al. |
| 2005/0202254 A1 | 9/2005 | Nunez-Regueiro et al. |
| 2006/0046073 A1 | 3/2006 | Neuman et al. |
| 2007/0036989 A1 | 2/2007 | Medwick et al. |

FOREIGN PATENT DOCUMENTS

| | | |
|---|---|---|
| WO | WO 2009/132998 | 11/2009 |
| WO | WO 2010/053921 | 5/2010 |

*Primary Examiner* — Derek S Chapel
(74) *Attorney, Agent, or Firm* — Nixon & Vanderhye P.C.

(57) ABSTRACT

A coated article includes a low-E coating having an absorbing layer located over a functional layer (IR reflecting layer) and designed to cause the coating to have an increased outside reflectance (e.g., in an IG window unit) and good selectivity. In certain embodiments, the absorbing layer is metallic, or substantially metallic, and is provided directly over and contacting a lower of two IR reflecting layers. In certain example embodiments, a nitride based layer (e.g., silicon nitride or the like) may be located directly over and contacting the absorbing layer in order to reduce or prevent oxidation thereof during heat treatment (e.g., thermal tempering, heat bending, and/or heat strengthening) thereby permitting predictable coloration, high outside reflectance values, and/or good selectivity to be achieved.

29 Claims, 2 Drawing Sheets

COATED ARTICLE WITH LOW-E COATING HAVING ABSORBING LAYER OVER FUNCTIONAL LAYER DESIGNED TO INCREASE OUTSIDE REFLECTANCE

This invention relates to a coated article including a low-E coating. In certain example embodiments, an absorbing layer of the low-E coating is located over a functional layer (IR reflecting layer) and is designed to cause the coating to have an increased outside reflectance (e.g., in an IG window unit), and/or increased glass side visible reflectance (e.g., measured monolithically), and good selectivity. In certain example embodiments, the absorbing layer is metallic, or substantially metallic, and is provided directly over and contacting a lower of two IR reflecting layers. In certain example embodiments, a nitride based layer (e.g., silicon nitride or the like) is located directly over and contacting the absorbing layer in order to reduce or prevent oxidation thereof during heat treatment (e.g., thermal tempering, heat bending, and/or heat strengthening) thereby permitting predictable coloration, high outside reflectance values, and/or good selectivity to be achieved after the heat treatment. Coated articles according to certain example embodiments of this invention may be used in the context of insulating glass (IG) window units, vehicle windows, other types of windows, or in any other suitable application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of high outside reflectance for aesthetic purposes combined with good selectivity, desirable visible transmission, low emissivity (or emittance), and low sheet resistance ($R_s$). Low-emissivity (low-E) and low sheet resistance characteristics permit such coated articles to block significant amounts of IR radiation so as to reduce for example undesirable heating of vehicle or building interiors. However, heat treatment of coated articles typically requires use of temperature(s) of at least 580 degrees C., more preferably of at least about 600 degrees C. and still more preferably of at least 620 degrees C. The use of such high temperatures (e.g., for 5-10 minutes or more) often causes coatings to break down, have undesirably low outside visible reflectance and/or causes one or more of the aforesaid desirable characteristics to significantly deteriorate in an undesirable manner.

U.S. Patent Document 2005/0202254, commonly owned and hereby incorporated herein by reference, discloses a coated article having the following layers on a glass substrate, from the glass substrate outwardly.

Layer
Glass Substrate
$TiO_2$
$Si_3N_4$
ZnO
Ag
$NiCrO_x$
$SnO_2$
$Si_3N_4$
$SnO_2$
ZnO
Ag
$NiCrO_x$
$SnO_2$
$Si_3N_4$ While the aforesaid coated article is heat treatable, and has many desirable and good characteristics, it does have problems regarding its undesirably low outside visible reflectance when the coated article is used in an IG window unit. In particular, U.S. 2005/0202254 states that IG window units having the coating are only able to realize an outside glass side visible reflectance of 1-12%.

As another example, while the coated article of U.S. Pat. No. 8,017,243 has many desirable and good characteristics, it has problems regarding its undesirably low outside or glass side reflective visible reflectance. In particular, the tables in the '243 patent show that IG window units having the coating are only able to realize an outside glass side visible reflectance of 1-14% (see the RgY values).

As another example, while the coated article of U.S. Pat. No. 7,419,725 has many desirable and good characteristics, it has problems regarding its undesirably low outside or glass side reflective visible reflectance. In particular, Examples 1-2 in the '725 patent show that IG window units having the coating are only able to realize an outside glass side visible reflectance of 16.9 to 17.7% (see the RgY values).

In view of the above, it will be apparent to those skilled in the art that there exists a need in the art for a coated article with more desirable optical characteristics (e.g., higher outside glass side visible reflectance in an IG window unit combined with low-emissivity and desirable visible transmission).

BRIEF SUMMARY OF EXAMPLE EMBODIMENTS OF THE INVENTION

This invention relates to a coated article including a low-E coating. In certain example embodiments, an absorbing layer of the low-E coating is located over a functional layer (IR reflecting layer) and is designed to cause the coating to have an increased outside visible reflectance (e.g., in an IG window unit) and/or increased glass side visible reflectance (e.g., measured monolithically), along with desired visible transmission, selectivity, a low SHGC, and low emissivity. In certain example embodiments, the absorbing layer is metallic, or substantially metallic, and is provided directly over and contacting a lower of two IR reflecting layers. In certain example embodiments, the metallic or substantially metallic absorbing layer (e.g., NiCr) is from about 25-50 angstroms (Å) thick. Unexpectedly, this has surprisingly been found to increase outside visible reflectance in IG window unit applications, and/or increased glass side visible reflectance in when measured monolithically, while still permitting desirable visible transmission and low-emissivity. In certain example embodiments, a nitride based layer (e.g., silicon nitride or the like) is located directly over and contacting the absorbing layer in order to reduce or prevent oxidation thereof during heat treatment (e.g., thermal tempering, heat bending, and/or heat strengthening) thereby permitting predictable coloration, high outside reflectance values, and/or good selectivity to be achieved after the heat treatment. Coated articles according to certain example embodiments of this invention may be used in the context of insulating glass (IG) window units, vehicle windows, other types of windows, or in any other suitable application.

In certain example embodiments of this invention, there is provided a coated article including a coating supported by a glass substrate, the coating comprising: first and second infrared (IR) reflecting layers comprising silver, wherein the first IR reflecting layer is located closer to the glass substrate than is the second IR reflecting layer, and wherein the first IR reflecting layer comprising silver is located over and directly contacting a layer comprising zinc oxide; a substantially metallic absorption layer located over and directly contacting the first IR reflecting layer; a layer comprising a nitride located over and directly contacting the substantially metallic absorption layer; a layer comprising metal oxide located over the layer comprising the nitride; at least one dielectric layer located over the second IR reflecting layer; and wherein the coating has a sheet resistance of less than or equal to 3.0 ohms/square, and the coated article measured monolithically has a visible transmission of from about 20-70% and a glass side visible reflectance of at least 20%. In certain example embodiments the coated article may be heat treated (e.g., thermally tempered so that the tempering is performed when the coating is on the glass substrate). In certain example embodiments, the coated article may be provided in an IG window unit.

DETAILED DESCRIPTION OF EXAMPLE EMBODIMENTS OF THE INVENTION

Figure 1:
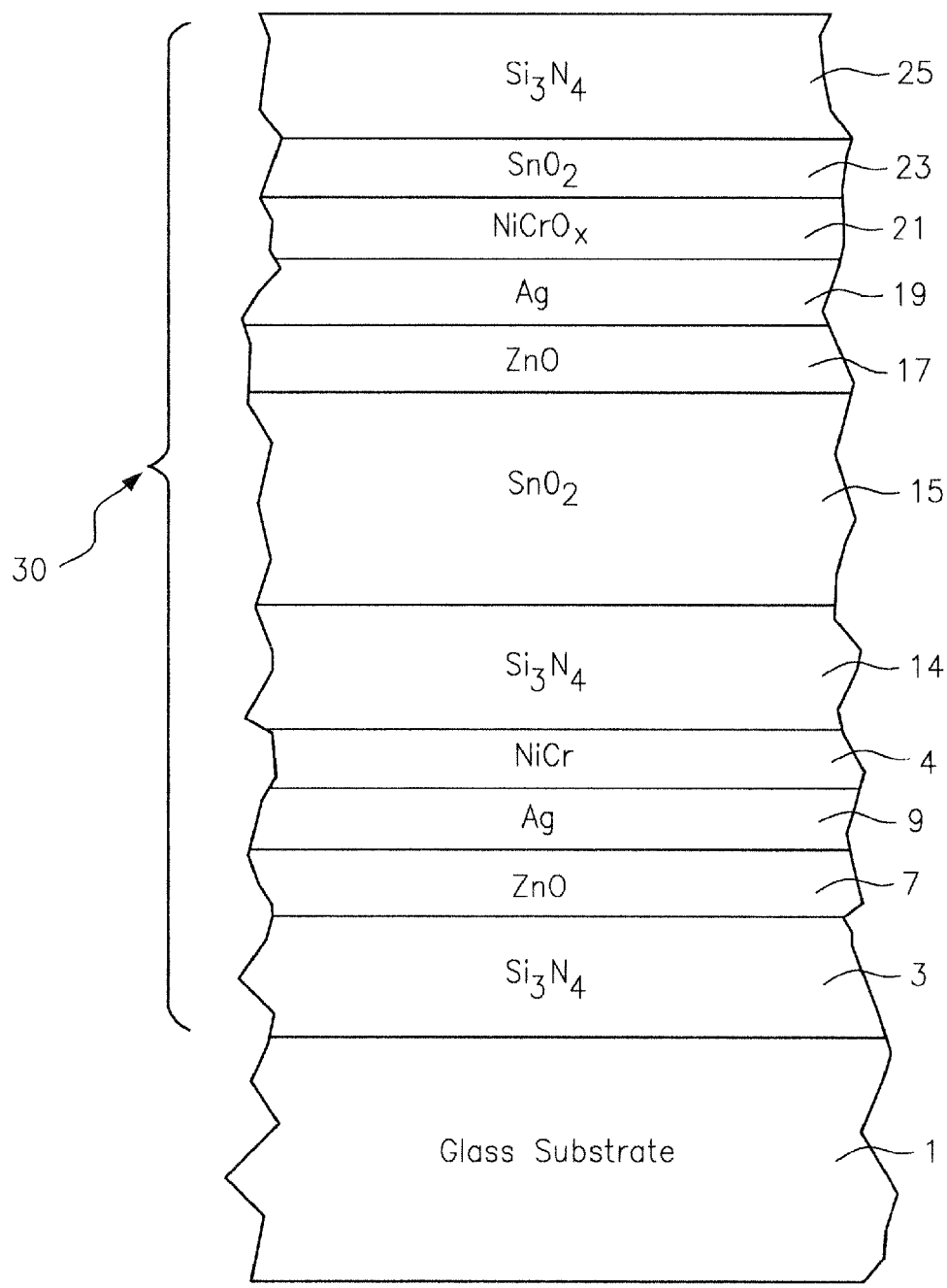
FIG. 1 is a cross sectional view of a coated article according to an example embodiment of this invention.

Coated articles herein may be used in applications such as IG window units, vehicle windows, monolithic architectural windows, residential windows, and/or any other suitable application that includes single or multiple glass substrates.

In certain example embodiments of this invention, the coating includes a double-silver stack, although this invention is not so limited in all instances.

For example, in certain example embodiments of this invention, heat treated (HT) and/or non-HT coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.0, and most preferably less than or equal to 1.7). In certain example embodiments, following and/or before heat treatment (HT) and as measured in monolithic form, coated articles herein are capable of realizing a visible transmission (Ill. C, 2 degree) of from about 20-70%, more preferably from about 30-60%, even more preferably from about 35-55%, and most preferably from about 40-50%. Moreover, in certain example embodiments (HT or non-HT), when coupled to another glass substrate to form an IG window unit, IG window unit coated articles according to certain example embodiments of this invention are capable of realizing a visible transmission of from about 20-70%, more preferably from about 30-60%, even more preferably from about 35-55%, more preferably from about 40-50%, and most preferably from about 41-46%. In certain example embodiments, following and/or before heat treatment (HT) and as measured in monolithic form, the glass side visible reflectance (RgY %) is significantly higher (e.g., at least about 5% higher, more preferably at least about 10% or 15% higher than the film side visible reflectance (RfY %). For example, where 24% is the glass side visible reflectance and 12% is the film side visible reflectance, the glass side visible reflectance is 12% higher than the film side visible reflectance (24%−12%=12%). In certain example embodiments of this invention, following and/or before heat treatment (HT) and as measured in monolithic form, coated articles herein are capable of realizing a glass side visible reflectance (RgY %) of at least 20%, more preferably from 20-50%, more preferably from about 20-40%, more preferably from about 20-35%, even more preferably from about 22-35%, and most preferably from about 24-30%. Moreover, in certain example embodiments (HT or non-HT), when coupled to another glass substrate to form an IG window unit, IG window unit coated articles according to certain example embodiments of this invention are capable of realizing a glass side visible reflectance (RgY %) of at least 20%, more preferably from about 20-50%, more preferably from about 20-40%, more preferably from about 20-35%, even more preferably from about 22-35%, more preferably from about 23-30% or from about 24-29%, and most preferably from about 25-27%). In certain example embodiments, the coating also enables IG units to have an SHGC value of less than 0.27, more preferably less than 0.25, and most preferably less than 0.24 in combination with any of the embodiments herein.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 7.0 mm thick, even more preferably from about 5-7 mm thick, with an example thickness being about 6 mm), and low-E coating (or layer system) 30 provided on the substrate 1 either directly or indirectly. The coating (or layer system) 30 includes, for example: bottom dielectric silicon nitride based and/or inclusive layer 3 which may be $Si_3N_4$ (which may or may not be doped with other material(s) such as aluminum in certain example instances) of the Si-rich type for haze reduction, or of any other suitable stoichiometry silicon nitride in different embodiments of this invention, first lower dielectric contact layer 7 (which contacts bottom IR reflecting layer 9), first conductive and preferably metallic infrared (IR) reflecting layer 9, metallic or substantially metallic absorbing layer 4 (e.g., of or including NiCr or the like) which is located over and directly contacts layer IR reflecting layer 9), dielectric silicon nitride based and/or inclusive layer 14 which is located over and directly contacts the absorbing layer 4, tin oxide inclusive based and/or inclusive interlayer 15, second lower dielectric contact layer 17 (which contacts IR reflecting layer 19), second conductive and preferably metallic IR reflecting layer 19, upper contact layer 21 (which contacts IR reflecting layer 19), dielectric layer 23, and finally protective dielectric layer 25. The "contact" layers 7, 17 and 21 each contact at least one IR reflecting layer (e.g., layer based on Ag). The aforesaid layers 3-25 make up low-E (i.e., low emissivity) coating 30 that is provided on glass or plastic substrate 1. In certain example embodiments, there is no dielectric high index layer (e.g., $TiO_2$ layer) between the lower IR reflecting layer 9 and the glass substrate 1 ("high index layer" meaning a layer having a refractive index n greater than about 2.15).

In certain example embodiments, the problem we have solved is how to create a coating that has a high differential between glass side reflection (RgY) and film side reflection (RfY), including for instance after the heat treating (e.g., thermal tempering) process. Typically, with double silver coating designs the difference between the magnitude of glass side and film visible reflections is low. A high differential is aesthetically desired for certain markets such as certain portions of the commercial market. Thus, in certain example embodiments of this invention, coated articles have been designed to have a high, mirror like, glass side visible reflection while maintaining a low film side visible reflection. While certain single silver coatings have been able to do this in the past, certain example embodiments of this invention relate to a multi-silver coating capable of realizing this. A drawback of such single silver coatings is that they tend to have a rather high solar heat gain coefficient (SHGC) of 0.29 and cannot meet the energy code standard of SHGC <0.25 being proposed where high solar loads are common. Certain example embodiments of this invention meet the energy code standards by providing a SHGC of approximately 0.23 while maintaining the high reflection differential aesthetics discussed herein. In certain example embodiments of this invention, by using a metallic or substantially metallic "absorbing" NiCr layer instead of a "transparent" NiCrOx layer above the lower silver, a high RgY/RfY differential after heat treating can be realized. In certain example embodiments, in order to avoid significant oxidizing of the NiCr into NiCrOx above the lower silver during the heating process a nitride layer such as silicon nitride is deposited directly on top of the absorbing NiCr layer. Furthermore, in certain example embodiments, in order to minimize or reduce transmitted haze and maintain optical properties during heating a small amount of nitrogen (50 mL) may be introduced into the absorbing layer directly over the lower silver. The nitrogen has little impact on the immediate optical properties of the NiCr but enables it to remain metallic or substantially metallic during heating.

Figure 2:
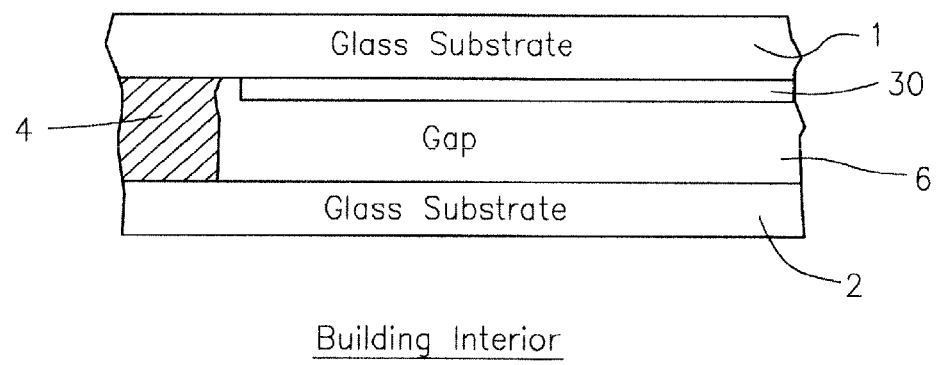
FIG. 2 is a cross section view of an IG unit according to an example embodiment of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Pat. No. 7,189,458, the disclosure of which is hereby incorporated herein by reference. An example IG window unit may include, for example, the coated glass substrate 1 shown in FIG. 1 coupled to another glass substrate via spacer(s), sealant(s) or the like, with a gap being defined therebetween. This gap between the substrates in IG unit embodiments may in certain instances be filled with a gas such as argon (Ar). An example IG unit may comprise a pair of spaced apart clear glass substrates each about 3-7 mm (e.g., 6 mm) thick, one of which is coated with a coating 30 herein in certain example instances, where the gap between the substrates may be from about 5 to 30 mm, more preferably from about 10 to 20 mm, and most preferably about 12 mm. In certain example instances, the coating 30 may be provided on the interior surface of either substrate facing the gap, however in preferred embodiments the coating 30 is provided on the interior surface of the outer glass substrate 1 as shown in FIG. 2. An example IG window unit is also shown in FIG. 2 and may include, for example, the coated glass substrate 1 shown in FIG. 1 coupled to another glass substrate 2 via spacer(s), sealant(s) or the like 4 with a gap 6 being defined therebetween. This gap 6 between the substrates in IG unit embodiments may in certain instances be filled with a gas such as argon (Ar). The gap 6 may or may not be at a pressure less than atmospheric in different embodiments of this invention.

Still referring to FIG. 2, an example IG unit may comprise a pair of spaced apart glass substrates (1 and 2) each about 6 mm thick, one of which is coated with a coating 30 herein in certain example instances, where the gap 6 between the substrates may be from about 5 to 30 mm, more preferably from about 10 to 20 mm, and most preferably about 12-16 mm. In certain example embodiments, the coating 30 is provided on the interior surface of the outer glass substrate 1 as shown in FIG. 2 (i.e., on surface #2 from the outside), although it may be provided on the other substrate 2 in alternative embodiments of this invention.

Absorption layer 4 is, in certain example embodiments of this invention, located over and directly contacting the lower IR reflecting layer 9. In certain example embodiments, the layer 14 located directly over and contacting the absorption layer 4 is a nitride-based layer and is substantially or entirely non-oxidized. This is advantageous in that it helps prevent (or reduce the likelihood of) the absorption layer from being oxidized during heat treatment, thereby better allowing the absorption layer to perform one of its intended functions, in particular absorbing at least some amount (e.g., at least 5%, more preferably at least 10%) of visible light. It will be appreciated that if a layer becomes too oxidized during heat treatment or the like, it no longer can function as an adequate absorption layer.

In certain example embodiments of this invention, absorption layer 4 may be of or include Ni and/or Cr (e.g., NiCr with any suitable ratio of Ni:Cr). In certain example embodiments, it is desired that the absorption layer 4 comprises from 0-10% oxygen, more preferably from 0-5% oxygen, and most preferably from 0-2% oxygen (atomic %). Moreover, from 0-20% nitrogen, more preferably from 1-15% nitrogen, and most preferably from 1-10% nitrogen (atomic %) may be provided in the absorbing layer 4. While NiCr (e.g., possibly nitrided in certain example embodiments) is a preferred material for the absorption layer 4, it is possible that other materials may instead be used or in addition to Ni and/or Cr. For example, in certain other example embodiments of this invention, the absorption layer 4 may be of or include Ni, Cr, NiCrN$_x$, CrN, ZrN, or the like. In non-heat treatable embodiments, any of the aforesaid materials may be used for the absorption/absorbing layer 4, as well as other materials such as Ti, Zr, NiOx or the like.

The absorbing layer 4 of the low-E coating is designed to cause the coating and/or coated article (including an IG unit in certain embodiments) to have an increased outside (and/or glass side) visible reflectance (e.g., in an IG window unit), along with desired visible transmission, selectivity, a low SHGC, and low emissivity. In certain example embodiments, the metallic or substantially metallic absorbing layer (e.g., NiCr) 4 is thinner than upper contact layer 21 and is from about 25-80 angstroms, more preferably from about 25-50 angstroms (Å) thick, more preferably from about 30-40 angstroms (Å) thick, and most preferably from about 33-37 angstroms (Å) thick (e.g., about 35 angstroms thick). Moreover, in certain example embodiments, absorbing layer 4 is either metallic or only slightly oxided, whereas upper contact layer 21 is significantly oxidized (e.g., at least about 50% oxided). Thus, layer 4 functions as an absorbing layer and surprisingly results in outside or glass side reflectance of the coated article being significantly increased, whereas upper contact layer 21 does not function as an absorbing layer.

In certain example embodiments, the metallic or substantially metallic absorbing layer 4 is located directly between and contacting metallic or substantially metallic IR reflecting layer 9 and nitride layer 14 in order to reduce or prevent oxidation of layer 4 during heat treatment (e.g., thermal tempering, heat bending, and/or heat strengthening) thereby permitting reflectance and visible transmission to be achieved following the heat treatment (HT).

Moreover, in certain example embodiments, a metal oxide based and/or inclusive layer 15 of or including tin oxide may be provided between the nitride based layer 14 and the upper infrared (IR) reflecting layer 19 and in particular, in certain example embodiments, between and directly contacting the nitride based layer 14 and the zinc oxide based and/or inclusive contact layer 17. For example, it has been found that the use of such a tin oxide inclusive interlayer 15 results in a coated article which is capable of realizing desired optical characteristics.

Dielectric layers 3, 14 and 25 may be of or include silicon nitride in certain embodiments of this invention. Silicon nitride layers 3, 14 and 25 may, among other things, improve heat-treatability of the coated articles, e.g., such as thermal tempering or the like. The silicon nitride of these layers may be of the stoichiometric type (i.e., $Si_3N_4$), or alternatively of the Si-rich type in different embodiments of this invention. For example, Si-rich silicon nitride 3 (and/or 14) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during HT to be more efficiently stopped by the Si-rich silicon nitride inclusive layer before they can reach the silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layer 3 may help reduce the amount of damage (e.g., oxidation) done to absorbing layer 4 during HT in certain example optional embodiments of this invention. In certain example embodiments, when Si-rich silicon nitride is used in layer 3 and/or 14, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4.

Any and/or all of the silicon nitride layers discussed herein may be doped with other materials such as stainless steel or aluminum in certain example embodiments of this invention. For example, any and/or all silicon nitride layers discussed herein (e.g., 3, 14 and/or 25) may optionally include from about 0-15% aluminum, more preferably from about 1 to 10% aluminum, in certain example embodiments of this invention. The silicon nitride may be deposited by sputtering a target of Si or SiAl in certain embodiments of this invention. Oxygen may also be provided in certain instances in one or more of the silicon nitride layers. Because layer 14 is provided to protect the absorbing layer 4 from oxidation during HT, in certain example embodiments, silicon nitride based layer 14 is at least about 50 angstroms thinner, more preferably at least about 100 angstroms thinner, than one or both of silicon nitride based layers 3 and/or 25. In certain example embodiments, silicon nitride based layer 14 is at least about 100 angstroms thinner than silicon nitride based layer 25 and is at least about 50 angstroms thinner than silicon nitride based layer 3. While silicon nitride is a preferred material for layers 3, 14 and 25 in certain example embodiments of this invention, it will be recognized that other materials instead or in addition may be used for one or more of these layers in alternative embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention. In certain example embodiments, the upper IR reflecting layer 19 is thicker (e.g., at least about 5 angstroms thicker, more preferably at least about 10 or 15 angstroms thicker) than the lower IR reflecting layer 9.

The upper contact layer 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in layer 21 allows durability to be improved. The $NiCrO_x$ of layer 21 may be fully (or substantially fully) oxidized in certain embodiments of this invention (i.e., fully stoichiometric), or may only be partially oxidized. In certain instances, the $NiCrO_x$ layer 21 may be at least about 50% oxidized. Contact layer 21 (e.g., of or including an oxide of Ni and/or Cr) may or may not be oxidation graded in different embodiments of this invention. Oxidation grading means that the degree of oxidation in the layer changes in the thickness of the layer so that for example a contact layer may be graded so as to be less oxidized at the contact interface with the immediately adjacent IR reflecting layer 19 than at a portion of the contact layer further or more/most distant from the immediately adjacent IR reflecting layer 19. Contact layer 21 (e.g., of or including an oxide of Ni and/or Cr) may or may not be continuous in different embodiments of this invention across substantially the entire IR reflecting layer 19.

Dielectric layer 15 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$) and/or tin. For example, in certain example embodiments of this invention, one or more of zinc oxide based layers 7, 17 may be doped with from about 1 to 10% Al, more preferably from about 1 to 5% Al, and most preferably about 1 to 4% Al.

Dielectric layer 23 may be of or include tin oxide in certain example embodiments of this invention. Like other layers of the coating, layer 23 is optional and need not be provided in certain example embodiments of this invention. Dielectric layer 25, which may be an overcoat in certain example instances, may be of or include silicon nitride (e.g., $Si_3N_4$) or any other suitable material in certain example embodiments of this invention. Optionally, other layers (e.g., a layer of or including zirconium oxide) may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating 30 is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while other non-illustrated layers may be added between the various layers in different example embodiments, or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective sputter-deposited layers on the glass substrate 1 in the FIG. 1 embodiment are as follows, from the glass substrate outwardly:

| Example Materials/Thicknesses; FIG. 1 Embodiment | | | |
|---|---|---|---|
| Layer<br>Glass (1-10 mm thick) | Preferred<br>Range (Å) | More<br>Preferred (Å) | Example<br>(Å) |
| $Si_xN_y$ (layer 3) | 40-250 Å | 50-200 Å | 120 Å |
| $ZnO_x$ (layer 7) | 10-300 Å | 40-150 Å | 100 Å |
| Ag (layer 9) | 90-200 Å | 130-170 Å | 151 Å |
| NiCr (layer 4) | 25-80 Å | 30-40 Å | 35 Å |
| $Si_xN_y$ (layer 14) | 20-250 Å | 25-80 Å | 43 Å |
| $SnO_2$ (layer 15) | 300-950 Å | 500-900 Å | 750 Å |
| $ZnO_x$ (layer 17) | 10-300 Å | 40-150 Å | 100 Å |
| Ag (layer 19) | 100-250 Å | 140-200 Å | 172 Å |
| $NiCrO_x$ (layer 21) | 20-60 Å | 30-50 Å | 40 Å |
| $SnO_2$ (layer 23) | 0-750 Å | 40-250 Å | 120 Å |
| $Si_3N_4$ (layer 25) | 80-750 Å | 100-320 Å | 225 Å |

In certain example embodiments of this invention, coated articles herein may have the following optical and solar characteristics set forth in Table 2 when measured monolithically (before any optional HT). The relevant optical characteristics are in accordance with Ill. C 2°, but note that L* values are Hunter. The sheet resistances ($R_s$) herein take into account all IR reflecting layers (e.g., silver based layers 9, 19).

| Optical/Solar Characteristics (Monolithic; pre-HT and/or post-HT) | | | |
|---|---|---|---|
| Characteristic | General | More Preferred | Most Preferred |
| Rs (ohms/sq.): | <=3.0 | <=2.0 | <=1.7 |
| RgY: | 20-40% | 22-35% | 24-30% |
| $T_{vis}$: | 20-70% | 30-60% | 40-50% |

Moreover, in certain example embodiments of this invention, coated articles herein which may have been optionally heat treated to an extent sufficient for tempering, and which have been coupled to another glass substrate to form an IG unit, may have the following IG unit optical/solar characteristics. Note that, when the coating 30 is on surface #2 of the IG window unit as shown in FIG. 2, the outside visible reflectance of the IG window unit is represented by $R_gY$ in the table below.

| Example Optical Features (IG Unit) | | |
|---|---|---|
| Characteristic | General | More Preferred |
| $T_{vis}$ (or TY)(Ill. C. 2°): | 30-60% | 35-55% |
| $a^*_t$ (Ill. C. 2°): | −15 to −1 | −10 to −3 |
| $b^*_t$ (Ill. C. 2°): | −4 to +8.0 | −1 to +4 |
| L* (Ill. C. 2°): | 58-80 | 61-74 |
| $R_fY$ (Ill. C., 2 deg.): | 9-15% | 11-14% |
| $a^*_f$ (Ill. C. 2°): | −10 to +2.0 | −4 to −1 |
| $b^*_f$ (Ill. C. 2°): | −14 to +4 | −12 to −4 |
| L* (Ill. C. 2°): | 30-55 | 35-47 |
| $R_gY$ (Ill. C., 2 deg.): | 20-40% | 24-29% |
| $a^*_g$ (Ill. C. 2°): | −12 to +2.0 | −10 to −1 |
| $b^*_g$ (Ill. C. 2°): | −10 to +5 | −7 to −1 |
| L* (Ill. C. 2°): | 34-65 | 40-60 |
| SHGC (surface #2): | <=0.27 | <=0.25, <=0.24, <=0.23 |

Moreover, in certain example embodiments the coated article is thermally stable upon heat treatment (e.g., thermal tempering), characterized by having a glass side reflective ΔE* value due to HT of no more than about 5.0, more preferably no more than about 4.5, when measured monolithically.

The following examples are provided for purposes of example only, and are not intended to be limiting unless specifically claimed.

EXAMPLES

The following Example 1 was made via sputtering on 6 mm thick clear glass substrates so as to have the layer stack set forth below. Example 1 is according to example embodiments of this invention as shown in FIG. 1. Example 1 had the following layer stack, where the thicknesses are in units of angstroms (Å).

| Layer<br>Glass (6 mm thick) | Thickness (Å) |
|---|---|
| $Si_xN_y$ (layer 3) | 120 Å |
| $ZnO_x$ (layer 7) | 100 Å |
| Ag (layer 9) | 151 Å |
| NiCr (layer 4) | 35 Å |
| $Si_xN_y$ (layer 14) | 43 Å |
| $SnO_2$ (layer 15) | 750 Å |
| $ZnO_x$ (layer 17) | 100 Å |
| Ag (layer 19) | 172 Å |
| $NiCrO_x$ (layer 21) | 40 Å |
| $SnO_2$ (layer 23) | 120 Å |
| $Si_3N_4$ (layer 25) | 225 Å |

Example 1 was thermally tempered and was calculated to have approximately the following characteristics measured monolithically following HT.

| Characteristic | Ex. 1 (HT) |
|---|---|
| $T_{vis}$ (or TY)(Ill. C. 2°): | 47.7% |
| $a^*_t$ (Ill. C. 2°): | −4.5 |
| $b^*_t$ (Ill. C. 2°): | 1.0 |
| $R_fY$ (Ill. C., 2 deg.): | 7.0% |

-continued

| Characteristic | Ex. 1 (HT) |
|---|---|
| a*$_f$ (Ill. C., 2°): | −3.0 |
| b*$_f$ (Ill. C., 2°): | −14.5 |
| R$_g$Y (Ill. C., 2 deg.): | 25.0% |
| a*$_g$ (Ill. C., 2°): | −1.5 |
| b*$_g$ (Ill. C., 2°): | −6.5 |
| ΔE* (transmissive): | <=4.5 |
| ΔE* (glass side reflective): | <=4.5 |

The tempered coated substrate of Example 1 was then coupled to another 6 mm clear glass substrate, with a 12 mm air gap therebetween, to form an IG window unit as shown in FIG. 2 and simulated to have approximately the following characteristics.

| Characteristic | Ex. 1 (IG Unit) |
|---|---|
| T$_{vis}$ (or TY)(Ill. C. 2°): | 42.7% |
| a*$_t$ (Ill. C. 2°): | −5.5 |
| b*$_t$ (Ill. C. 2°): | 1.0 |
| R$_t$Y (Ill. C., 2 deg.): | 13.0% |
| a*$_f$ (Ill. C., 2°): | −2.5 |
| b*$_f$ (Ill. C., 2°): | −8.0 |
| R$_g$Y (Ill. C., 2 deg.): | 26% |
| a*$_g$ (Ill. C., 2°): | −2.0 |
| b*$_g$ (Ill. C., 2°): | −6.0 |
| SHGC (surface #2): | 0.23 |
| Transmission Haze (%): | <=0.80 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. Any embodiment described herein may or may not be used in combination with any other embodiment described herein.

The invention claimed is:

1. A coated article including a coating supported by a glass substrate, the coating comprising:
   a first layer comprising silicon nitride supported by the glass substrate;
   a first layer comprising zinc oxide supported by the glass substrate and located over and directly contacting the first layer comprising silicon nitride;
   first and second infrared (IR) reflecting layers comprising silver, wherein the first IR reflecting layer is located closer to the glass substrate than is the second IR reflecting layer, and wherein the first IR reflecting layer comprising silver is located over and directly contacting the first layer comprising zinc oxide;
   a substantially metallic absorption layer comprising Ni and/or Cr located over and directly contacting the first IR reflecting layer;
   a second layer comprising silicon nitride located over and directly contacting the substantially metallic absorption layer;
   a layer comprising metal oxide located over and directly contacting the second layer comprising silicon nitride;
   a second layer comprising zinc oxide located over the layer comprising metal oxide and located under and directly contacting the second IR reflecting layer;
   at least one dielectric layer located over the second IR reflecting layer; and
   wherein the coating has a sheet resistance of less than or equal to 3.0 ohms/square, and the coated article measured monolithically has a visible transmission of from about 20-70% and a glass side visible reflectance of at least 20%, and wherein the glass side visible reflectance is at least 5% higher than a film side visible reflectance of the coated article.

2. The coated article of claim 1, wherein no high index layer is located between the first IR reflecting layer and the glass substrate.

3. The coated article of claim 1, wherein the coated article measured monolithically has a visible transmission of from about 35-55%.

4. The coated article of claim 1, wherein the coated article measured monolithically has a glass side visible reflectance of from 20-50%.

5. The coated article of claim 1, wherein the coated article measured monolithically has a glass side visible reflectance of from 20-35%.

6. The coated article of claim 1, wherein the coated article measured monolithically has a glass side visible reflectance of from 24-30%.

7. The coated article of claim 1, wherein the substantially metallic absorption layer has a thickness of from about 25-50 angstroms.

8. The coated article of claim 1, wherein the coated article has a visible transmission of from about 30-60%.

9. The coated article of claim 1, wherein the coated article has a visible transmission of from about 35-45%.

10. The coated article of claim 1, wherein said absorption layer consists essentially of NiCr.

11. The coated article of claim 1, wherein the coated article is heat treated.

12. The coated article of claim 1, wherein coated article is thermally tempered and has a glass side reflective ΔE* value of less than or equal to 4.5 due to the tempering.

13. The coated article of claim 1, wherein the second layer comprising silicon nitride is at least about 50 angstroms thinner than the first layer comprising silicon nitride.

14. The coated article of claim 1, wherein said metal oxide is tin oxide.

15. The coated article of claim 1, wherein said at least one dielectric layer located over the second IR reflecting layer comprising a third layer comprising silicon nitride.

16. The coated article of claim 15, wherein the second layer comprising silicon nitride is at least about 100 angstroms thinner than the third layer comprising silicon nitride.

17. The coated article of claim 1, wherein the second layer comprising zinc oxide directly contacts the layer comprising metal oxide.

18. An insulating glass (IG) window unit comprising said coated article of claim 1 coupled to another glass substrate with a space being provided therebetween.

19. The IG window unit of claim 18, wherein the coating is located on an interior surface of the glass substrate closest to the sun, and wherein the IG window unit has an outside visible reflectance of from 23-30% and an SHGC of less than 0.25.

20. A coated article including a coating supported by a glass substrate, the coating comprising:
   first and second infrared (IR) reflecting layers comprising silver, wherein the first IR reflecting layer is located closer to the glass substrate than is the second IR reflecting layer, and wherein the first IR reflecting layer comprising silver is located over and directly contacting a layer comprising zinc oxide;

a substantially metallic absorption layer located over and directly contacting the first IR reflecting layer;

a layer comprising a nitride located over and directly contacting the substantially metallic absorption layer;

a layer comprising metal oxide located over the layer comprising the nitride;

at least one dielectric layer located over the second IR reflecting layer; and wherein the coating has a sheet resistance of less than or equal to 3.0 ohms/square, and the coated article measured monolithically has a visible transmission of from about 20-70% and a glass side visible reflectance of at least 20%.

21. The coated article of claim 20, wherein no high index layer is located between the first IR reflecting layer and the glass substrate.

22. The coated article of claim 20, wherein the coated article measured monolithically has a glass side visible reflectance of from 24-30%.

23. The coated article of claim 20, wherein the substantially metallic absorption layer has a thickness of from about 25-50 angstroms.

24. The coated article of claim 20, wherein said absorption layer comprises a nitride of NiCr.

25. The coated article of claim 20, wherein said absorption layer comprises NiCr.

26. The coated article of claim 20, wherein coated article is thermally tempered and has a glass side reflective ΔE* value of less than or equal to 4.5 due to the tempering.

27. The coated article of claim 20, wherein the glass side visible reflectance is at least 5% higher than a film side visible reflectance of the coated article.

28. The coated article of claim 20, wherein the glass side visible reflectance is at least 10% higher than a film side visible reflectance of the coated article.

29. The coated article of claim 20, wherein the glass side visible reflectance is at least 15% higher than a film side visible reflectance of the coated article.

* * * * *